United States Patent [19]
Misawa

[11] Patent Number: 5,526,083
[45] Date of Patent: Jun. 11, 1996

[54] FINDER SYSTEM OF A CAMERA

[75] Inventor: Masayuki Misawa, Tokyo, Japan

[73] Assignee: Asahi Kogaku Kogyo Kabushiki Kaisha, Tokyo, Japan

[21] Appl. No.: 357,315

[22] Filed: Dec. 16, 1994

[30]   Foreign Application Priority Data

Dec. 27, 1993  [JP]  Japan .................... 5-333190

[51] Int. Cl.$^6$ .................................................. G03B 13/02
[52] U.S. Cl. ................................................................ 354/225
[58] Field of Search ........................... 354/219, 224, 354/471, 155, 410, 225

[56]   References Cited

U.S. PATENT DOCUMENTS

| | | | |
|---|---|---|---|
| 5,155,516 | 10/1992 | Shindo | 354/219 |
| 5,260,734 | 11/1993 | Shindo | 354/219 |
| 5,262,807 | 11/1993 | Shindo | 351/210 |
| 5,293,535 | 5/1994 | Sensui | 354/410 |

FOREIGN PATENT DOCUMENTS

| | | |
|---|---|---|
| 5188278 | 7/1993 | Japan . |
| 2263175 | 7/1993 | United Kingdom . |

*Primary Examiner*—W. B. Perkey
*Attorney, Agent, or Firm*—Greenblum & Bernstein

[57]        ABSTRACT

A finder system of a camera has an eye direction detecting device for detecting a direction in which a photographer's eye is looking and a display for displaying information related to operating parameters of the camera in a view field of the finder system. The finder system further includes a display prism for transmitting light from a projector of the display to the view field, and a detecting prism for transmitting light reflected from the eye that is projected by a light emitting element of the eye direction detecting device to a light detecting element of the eye direction detecting device. The display prism and the detecting prism are formed as a single block prism.

9 Claims, 4 Drawing Sheets

FINDER SYSTEM OF A CAMERA

BACKGROUND OF THE INVENTION

The present invention relates to a finder system used in a camera. More specifically the present invention relates to a finder system used in a SLR (single lens reflex) camera which has a display for indicating operating parameters of the camera, such as shutter speed, aperture value etc., and a device for detecting a direction that a person's eye looking through the finder system, is focused on (hereinafter referred to as an eye direction detecting device).

Recently SLR cameras have been provided with a viewfinder display and an eye direction detecting device. The eye direction detecting device consists of a light source used to illuminate the person's eye and a senor to detect light reflected back from the person's eye. The reflected light from the eye is transmitted through an eyepiece lens and a pentaprism. The light then exits the pentaprism and is reflected by a detecting prism attached to one surface of the pentaprism towards the sensor of the eye direction detecting device. The sensor outputs a signal that varies with the direction in which the person is looking. A microprocessor of the camera then determines the direction that the person is looking based on the output signal from the sensor.

Further, the display used to indicate the operating parameters of the camera emits light to a display prism attached to another surface of the pentaprism. The display prism reflects the light and transmits the light to the pentaprism where it is viewed through the eyepiece lens by the person.

However, with this construction, a separate display prism and detecting prism are required for the display and the eye direction detecting device, respectively. This increases the size of the camera and the cost in manufacturing the camera.

SUMMARY OF THE INVENTION

It is therefore an object of the present invention to reduce the size of the camera having a finder system which includes a display and an eye direction detecting device.

According to one aspect of the present invention, there is provided a finder system of a camera having an eye direction detecting device for detecting a direction in which a photographer's eye is looking and a display for displaying information related to operating parameters of the camera in a view field of the finder system, the finder system further includes a display prism for transmitting light from a projector of the display to the view field, and a detecting prism for transmitting light reflected from the eye that is projected by a light emitting element of the eye direction detecting device to a light detecting element of the eye direction detecting device. The display prism and the detecting prism are formed as a single block prism.

Optionally, the single block prism is attached to one of a plurality of reflecting surfaces of a pentaprism provided in the finder system of the camera, the pentaprism being used to erect an image formed by an objective lens of the cameras.

Still optionally, the display prism portion of the block prism is formed having a pair of parallel planar transmission surfaces and a plurality of reflecting surfaces, the light from the projector of the display is incident on one of the planar transmission surfaces, reflected by each of the reflecting surfaces, and then exits the other of the planar transmission surfaces.

According to another aspect of the present invention, there is provided a single block prism which includes a display prism having a pair of parallel planar transmission surfaces and a plurality of reflecting surfaces, and a detecting prism for internally reflecting the light that is transmitted through the transmission surfaces, the detecting prism being attached to the display prism. Light from a projector is incident on one of the planar transmission surfaces of the detecting prism and is reflected by the plurality of reflecting surfaces.

DESCRIPTION OF THE EMBODIMENTS

An embodiment of the finder system of an SLR camera will be described with reference to the accompanying drawings.

Figure 1:
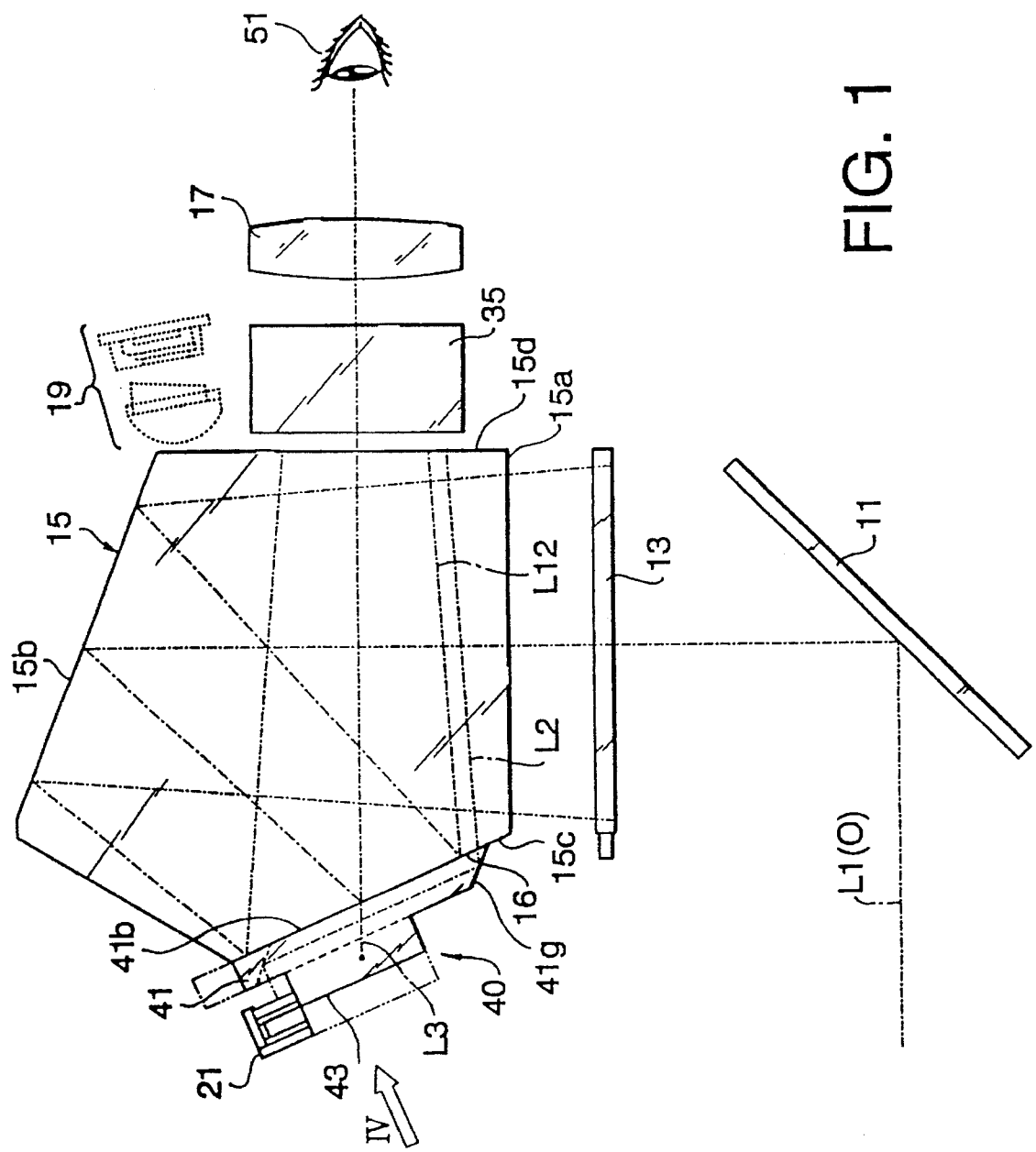
FIG. 1 is a cross-sectional view of a finder system of a camera according to an embodiment of the present invention, taken along a plane containing an optical axis.

The finder system includes a quick-return mirror 11, a focusing screen 13, a pentaprism 15, and an eyepiece lens 17, as shown in FIG. 1. Light L1 from an object to be photographed is incident on a photographing lens (not shown) along optical axis O. The light L1 is then transmitted to the quick-return mirror 11 and reflected to the focusing screen 13 to form an in-focus image of the object. The image is then erected by the pentaprism 15 and viewed using the eyepiece lens 17.

When the light L1 is incident on the pentaprism 15, the light L1 passes through a surface 15a, is reflected by a first reflecting surface 15b (a roof-shaped surface), then reflected by a second reflecting surface 15c to a surface 15d. The light passes through the surface 15d and is incident on the eyepiece lens 17, where an erect image corresponding to the light L1 can be viewed by a person.

A display for showing the operating parameters of the camera such as shutter speed, aperture value etc., consists of a projector 21 and a display prism 41. The projector 21 is located behind the second reflecting surface 15c of the pentaprism 15, while a portion of the display prism 41 contacts the second reflecting surface 15c.

Figure 2:
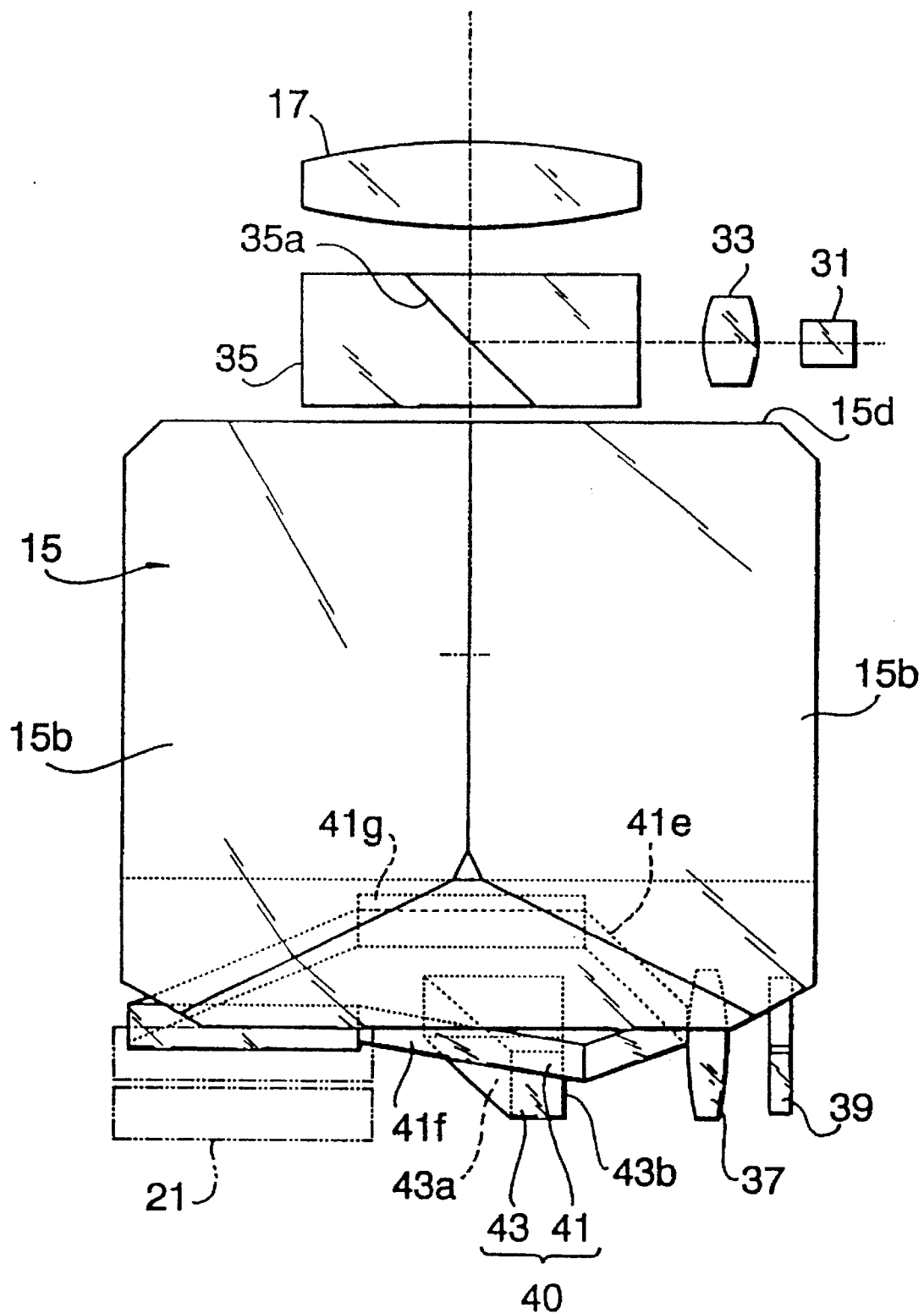
FIG. 2 is a top view of the finder system shown in FIG. 1.
Figure 3:
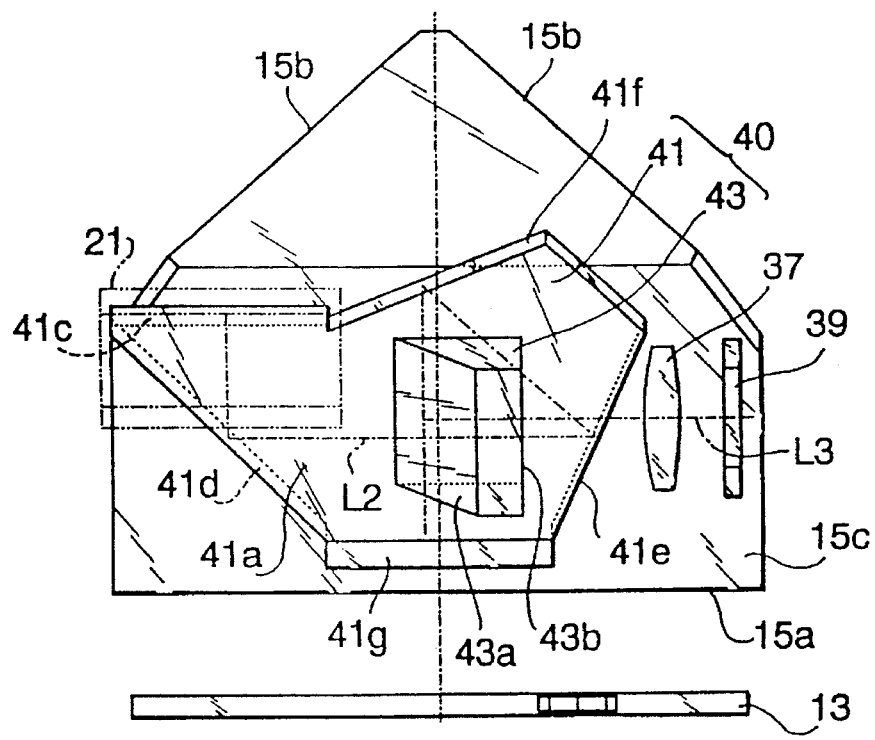
FIG. 3 is a front view of the finder system shown in FIG. 1.

As shown in FIG. 2, light source of the eye direction detecting device is composed of a light emitter 31, a projecting lens 31, and a cemented prism 35. A half mirror 35a is formed at the cemented portion of the prism 35. The cemented prism 35 is positioned between the surface 15d of the pentaprism and the eyepiece lens 17.

A light detector of the eye direction detecting device is composed of a detecting prism 43, a detecting lens 37 and a light sensor 39.

The finder is also provided with a photometric device 19, for metering light reflected from the object to be photographed.

In the embodiment described above, the display prisms 41 and detecting prism 43 are formed as a single block prism 40.

Figure 4:
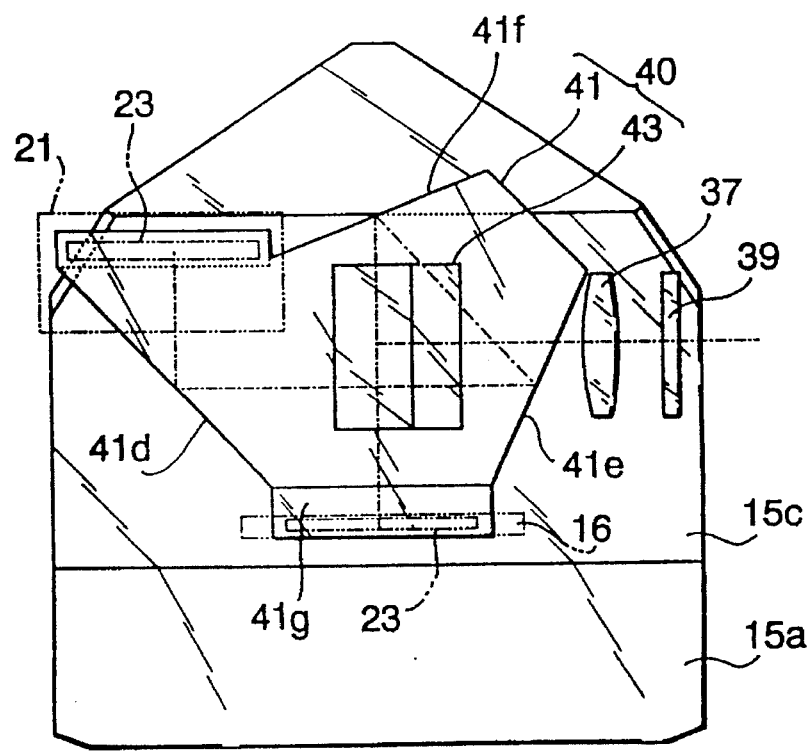
FIG. 4 is a front view of the finder system shown in FIG. 1 looking in the direction IV shown in FIG. 1.
Figure 5A:
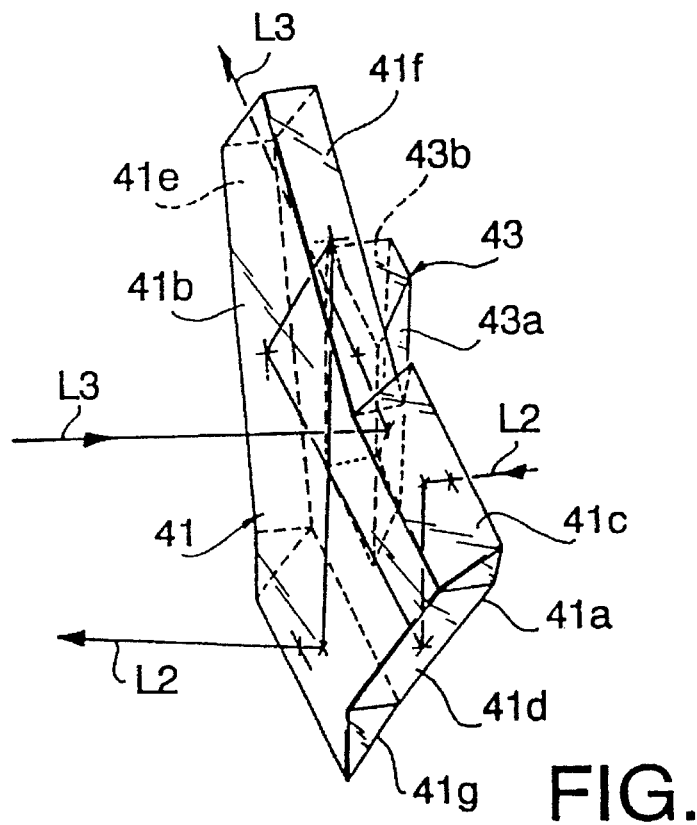
FIGS. 5A and 5B are perspective views of a prism attached to a pentaprism of the finder system shown in FIG. 1.
Figure 5B:
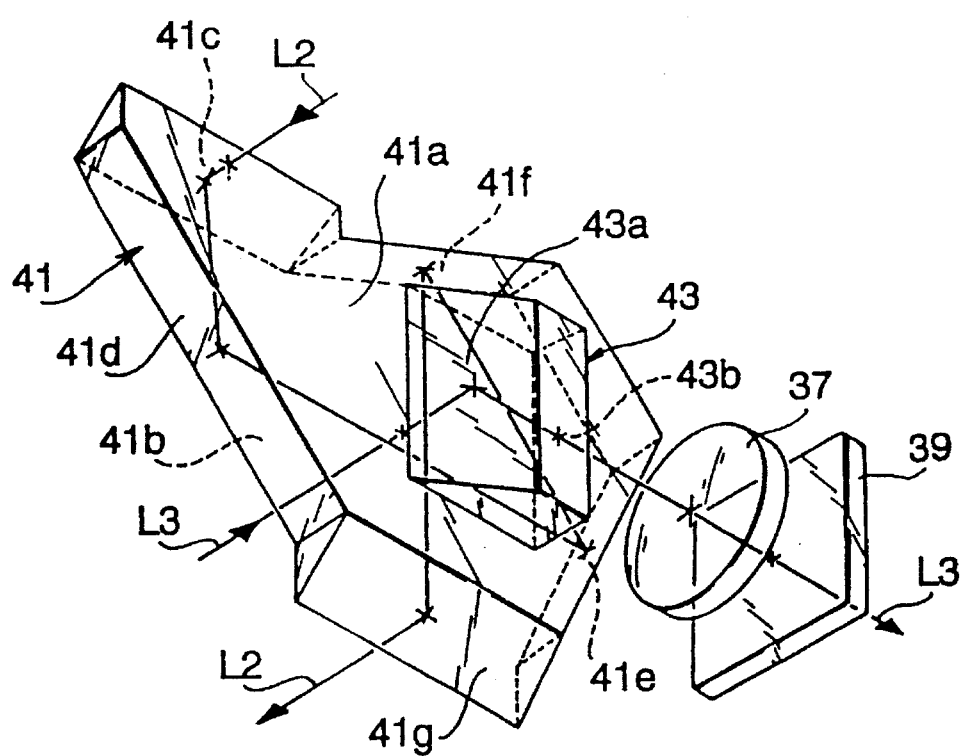

FIGS. 5A and 5B show perspective views of the block prism 40. The portion of the block prism 40 related to the display prism 41 consists of seven surfaces 41a through 41g. These seven surfaces 41a through 41g guide light L2 from the projector 21 of the display to the eyepiece lens 17. As shown in FIG. 5B, the light L2 enters the display prism 41 through a window 23 (FIG. 4) of the surface 41a and is reflected by the reflecting surfaces 41c, 41d, 41e, 41f and 41g in order, before exiting through the surface 41b. The surfaces 41a and 41b are formed as planes parallel to each other. The reflecting surface 41c is inclined at 45° to the plane surface 41a. The reflecting surfaces 41d, 41e and 41f are formed perpendicular to the plane surfaces 41a and 41b. The reflecting surface 41g is also inclined with respect to the plane surface 41a.

The portion of the block prism 40 related to the detecting prism 43 is a trapezoidal prism. Light L3 passes through the surfaces 41b of the prism 41 and is incident on the reflecting surface 43a and reflected to the surface 43b. The light L3 then exits the detecting prism 43 and is transmitted through the detecting lens 37 to be incident on the sensor 39.

As shown in FIG. 1, the prism block 40 is arranged such that the surface 41b contacts the pentaprism 15 at the reflecting surface 15c. Further, a window 16 (see FIG. 4) is formed in the reflecting surface 15c to allow light reflected by the reflecting surface 41g to pass through. Thus the light L2 projected from the projector 21 is visible in a lower portion of a field of view of the finder system when viewed through the eyepiece lens 17.

The operation of the eye direction detecting device using the prism block 40 having the above configuration will be described below.

As shown in FIGS. 1, 2, 5A and 5B, L3 is emitted from light emitter 31, and projected by the projecting lens 33 to be incident on the half-mirror 35a of the cemented prism 35. Half the light L3 is reflected towards the eyepiece lens 17 and is incident on the eye 51. Light is then reflected by the eye 51, transmitted through the eyepiece lens 17 and the half mirror 35a, and incident on the surface 15d of the pentaprism 15. Light L3 is then transmitted through the surface 15d and incident on the reflecting surface 15c. A small portion of the reflecting surface 15c is formed as a half-mirror and allows light L3 to pass through. The light L3 then enters the prism block 40 through the surface 41b, is reflected on the reflecting surface 43a and exits through the surface 43b, as described before. The exit ray is then transmitted through the detecting lens 37 and is incident on the sensor 39. The sensor 39 outputs an electrical signal to a controller (not shown) which determines a direction that the eye 51 is looking, based on the level of the output signal.

As described above, since the display prism 41 and detecting prism 43 are formed as a single block prism 40, the number of optical elements can be reduced. Further, the space required for each of the prisms 41, 43 can also be reduced. Furthermore, since the single block prism 40 is employed, the assembly of the finder system is made easier for the finder system that has a display and an eye direction detecting device.

The present disclosure relates to subject matter contained in Japanese Ptent Application No. HEI 5-333190 filed on Dec. 27, 1993, which is expressly incorporated herein by reference in its entirety.

What is claim is:

1. A finder system of a camera having an eye direction detecting device for detecting a direction in which a photographer's eye is looking and a display for displaying information related to operating parameters of said camera in a view field of said finder system, said finder system further comprises:

a display prism for transmitting light from a projector of said display to said view field; and a detecting prism for transmitting light reflected from said eye that is projected by a light emitting element of said eye direction detecting device to a light detecting element of said eye direction detecting device, wherein said display prism and said detecting prism are formed as a single block prism.

2. The finder system of a camera according to claim 1, further comprising a pentaprism having a plurality of reflecting surfaces, said pentaprism erecting an image formed by an objective lens, wherein said single block prism is attached to one of said plurality of reflecting surfaces of said pentaprism.

3. The finder system of a camera according to claim 2, wherein said display prism is attached directly to said pentaprism and said detecting prism is attached to said display prism.

4. The finder system of a camera according to claim 2, wherein said display prism is formed having a pair of parallel planar transmission surfaces and a plurality of reflecting surfaces, wherein light from said projector of said display is incident on one of said planar transmission surfaces, reflected by each of said reflecting surfaces, and exits the other of said planar transmission surfaces.

5. The finder system of a camera according to claim 4, wherein said plurality of reflecting surfaces comprises a first reflecting surface to reflect a light beam from said projector such that said light beam is parallel to said planar transmission surfaces, wherein second, third and fourth reflecting surfaces of said plurality of reflecting surfaces are perpendicular to said planar transmission surfaces, and wherein a fifth reflecting surface reflects said light beam towards said pentaprism.

6. The finder system of a camera according to claim 3, wherein said detecting prism has a reflecting surface to internally reflect a light beam transmitted through said display prism to said sensor.

7. The finder system of a camera according to claim 2, wherein light from said projector is incident on said pentaprism outside said optical axis of said objective lens.

8. A single block prism, comprising:

a display prism having a pair of parallel planar transmission surfaces and a plurality of reflecting surfaces, wherein light from a projector is incident on one of said planar transmission surfaces and is reflected by said plurality of reflecting surfaces; and a detecting prism for internally reflecting said light that is transmitted through said transmission surfaces, wherein said detecting prism is attached to said display prism.

9. The single block prism according to claim 8, which is used in a finder system of a camera, wherein said finder system comprises a pentaprism for erecting an image, and wherein said display prism is attached to one surface of said pentaprism.

* * * * *